(12) United States Patent
Sharma et al.

(10) Patent No.: US 11,755,743 B2
(45) Date of Patent: Sep. 12, 2023

(54) PROTECTING MACHINE LEARNING MODELS FROM PRIVACY ATTACKS

(71) Applicant: Microsoft Technology Licensing, LLC, Redmond, WA (US)

(72) Inventors: Amit Sharma, Bengaluru (IN); Aditya Vithal Nori, Cambridge (GB); Shruti Shrikant Tople, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 850 days.

(21) Appl. No.: 16/559,444

(22) Filed: Sep. 3, 2019

(65) Prior Publication Data

US 2021/0064760 A1 Mar. 4, 2021

(51) Int. Cl.
*G06F 21/57* (2013.01)
*G06N 20/00* (2019.01)
(Continued)

(52) U.S. Cl.
CPC ............ *G06F 21/577* (2013.01); *G06F 21/55* (2013.01); *G06F 21/6245* (2013.01); *G06N 5/04* (2013.01);
(Continued)

(58) Field of Classification Search
CPC .... G06F 21/577; G06F 21/55; G06F 21/6245; G06F 2221/031; G06F 2221/003;
(Continued)

(56) References Cited

U.S. PATENT DOCUMENTS 10,789,363 B1* 9/2020 Gursoy ............... G06F 21/6254
2013/0046721 A1* 2/2013 Jiang ...................... G06N 7/005
706/47
(Continued)

FOREIGN PATENT DOCUMENTS

CN 108959958 A 12/2018

OTHER PUBLICATIONS

"Bayesian Network Repository", Retrieved From: http://www.bnlearn.com/bnrepository/, Retrieved On: Sep. 4, 2019, 3 Pages.
(Continued)

*Primary Examiner* — Huan V Doan
(74) *Attorney, Agent, or Firm* — Ray Quinney & Nebeker; Tiffany Healy (57) ABSTRACT

This disclosure describes methods and systems for protecting machine learning models against privacy attacks. A machine learning model may be trained using a set of training data and causal relationship data. The causal relationship data may describe a subset of features in the training data that have a causal relationship with the outcome. The machine learning model may learn a function that predicts an outcome based on the training data and the causal relationship data. A predefined privacy guarantee value may be received. An amount of noise may be added to the machine learning model to make a privacy guarantee value of the machine learning model equivalent to or stronger than the predefined privacy guarantee value. The amount of noise may be added at a parameter level of the machine learning model.

19 Claims, 6 Drawing Sheets

(51) Int. Cl.
*G06F 21/55* (2013.01)
*G06F 21/62* (2013.01)
*G06N 5/04* (2023.01)

(52) U.S. Cl.
CPC ....... *G06N 20/00* (2019.01); *G06F 2221/031* (2013.01); *G06F 2221/033* (2013.01)

(58) Field of Classification Search
CPC ... G06F 2221/033; G06F 21/14; G06N 20/20; G06N 5/04; G06N 20/00
See application file for complete search history.

(56) References Cited

U.S. PATENT DOCUMENTS

| | | | | |
|---|---|---|---|---|
| 2014/0129152 | A1* | 5/2014 | Beer | G16B 20/20 702/19 |
| 2017/0316346 | A1* | 11/2017 | Park | G06N 20/00 |
| 2019/0147188 | A1* | 5/2019 | Benaloh | G06F 21/6245 726/26 |
| 2019/0188566 | A1* | 6/2019 | Schuster | G06N 3/08 |
| 2019/0192008 | A1* | 6/2019 | Maier-Hein | G06V 20/69 |
| 2019/0227980 | A1* | 7/2019 | McMahan | G06K 9/6256 |
| 2020/0082270 | A1* | 3/2020 | Gu | G06N 3/0427 |
| 2020/0410288 | A1* | 12/2020 | Capota | G06F 21/6245 |
| 2021/0012028 | A1* | 1/2021 | Cabot | G06F 17/18 |

OTHER PUBLICATIONS

"Tensorflow", Retrieved From: https://www.tensorflow.org/, Retrieved On: Sep. 3, 10 Pages.

Bengio,et al., "A Meta-transfer Objective for Learning to Disentangle Causal Mechanisms", In Journal of Computing Research Repository, Jan. 4, 2019, 26 Pages.

Carlini, et al., "The Secret Sharer: Measuring Unintended Neural Network Memorization & Extracting Secrets", In Journal of Computing Research Repository, Feb. 22, 2018, 18 Pages.

Datta, "Algorithmic Transparency via Quantitative Input Influence: Theory and Experiments with Learning Systems", In Proceedings of IEEE Symposium on Security and Privacy, May 22, 2016, pp. 598-617.

Dwork, et al., "The Algorithmic Foundations of Differential Privacy", In Foundations and Trends in Theoretical Computer Science, vol. 9, No. 3-4, Aug. 11, 2014, 26 Pages.

Esteva, et al., "A guide to Deep Learning in Healthcare", In Journal of Nature Medicine, vol. 25, Issue 1, Jan. 7, 2019, pp. 24-29.

Fischer, et al., "Deep Learning with long Short-term Memory Networks for Financial Market Predictions", In European Journal of Operational Research, vol. 270, Issue 2, Oct. 16, 2018, pp. 1-16.

Fredrikson, et al., "Model Inversion Attacks that Exploit Confidence Information and Basic Countermeasures", In Proceedings of the 22nd ACM SIGSAC Conference on Computer and Communications Security, Oct. 12, 2015, pp. 1322-1333.

Hamm,et al., "Learning Privately from Multiparty Data", In Proceedings of the 33rd International Conference on Machine Learning , vol. 48, Jun. 11, 2016, 9 Pages.

Hayes, "Logan: Membership Inference Attacks Against Generative Models ", In Repository of arXiv:1705.07663v4, Aug. 21, 2018, pp. 1-19.

Kusner, et al., "Counterfactual Fairness", In Advances in Neural Information Processing Systems, Dec. 4, 2017, 11 Pages.

Kusner, et al., "Private Causal Inference", In Repository of arXiv:1512.05469v1, Dec. 17, 2015, pp. 1308-1317.

Mansour,et al., "Domain Adaptation: Learning Bounds and Algorithms", In Journal of Computing Research Repository, Feb. 19, 2019, 12 Pages.

Mnih, et al., "Playing atari with deep reinforcement learning", In Journal of the Computing Research Repository, Dec. 2013, pp. 1-9.

Nabi, et al., "Fair Inference on Outcomes", In Proceedings of Thirty-Second AAAI Conference on Artificial Intelligence, vol. 2018, Apr. 25, 2018, pp. 1931-1940.

Nasr, et al., "Comprehensive Privacy Analysis of Deep Learning: Stand-alone and Federated Learning Under Passive and Active White-box Inference Attacks", In Journal of Computing Research Repository, Dec. 3, 2018, 15 Pages.

Nasr, et al., "Machine Learning with Membership Privacy Using Adversarial Regularization", In Proceedings of the 2018 ACM SIGSAC Conference on Computer and Communications Security, Oct. 15, 2018, pp. 634-646.

Papernot, et al., "Semi-supervised Knowledge Transfer for Deep Learning from Private Training Data", In Proceedings of 5th International Conference on Learning Representations, Apr. 24, 2017, pp. 1-16.

Judea;Pearl, "Causality", In Publication of Cambridge University Press, 2nd Edition, Sep. 14, 2009. 2 Pages.

Peters, et al., "Causal Inference by Using Invariant Prediction: Identification and Confidence Intervals", In Journal of the Royal Statistical Society: Series B, vol. 78 , Issue 5, Oct. 11, 2016, pp. 947-1012.

Peters, et al., "Elements of Causal Inference: Foundations and Learning Algorithms", In Publication of MIT Press, Nov. 29, 2017, 283 Pages.

Rahman, et al., "Membership Inference Attack Against Differentially Private Deep Learning Model", In Journal of Transactions on Data Privacy , vol. 11, Issue 1, 2018, pp. 61-79.

Salem, et al., "MI-leaks: Model and Data Independent Membership Inference Attacks and Defenses on Machine Learning Models", In Proceedings of the Network and Distributed System Security Symposium, Feb. 24, 2019,15 Pages.

Shokri, et al., "Membership Inference Attacks Against Machine Learning Models", In Proceedings of IEEE Symposium on Security and Privacy, May 22, 2017, pp. 3-18.

Song, et al., "The Natural Auditor: How to tell if Someone Used Your Words to Train Their Model", In Journal of The Computing Research Repository, Nov. 1, 2018, 15 Pages.

Tsantekidis, et al., "Using Deep Learning to Detect Price Change Indications in Financial Markets", In the Proceedings of 25th European Signal Processing Conference, Aug. 28, 2017, pp. 2580-2584.

Yeom, et al., "Privacy Risk in Machine Learning: Analyzing the Connection to Overfitting", In the Proceedings of IEEE 31st Computer Security Foundations Symposium, Jul. 9, 2018, pp. 268-282.

"International Search Report and Written Opinion Issued in PCT Application No. PCT/US20/037998", dated Sep. 24, 2020, 10 Pages.

* cited by examiner

PROTECTING MACHINE LEARNING MODELS FROM PRIVACY ATTACKS

CROSS-REFERENCE TO RELATED APPLICATIONS

N/A

BACKGROUND

Artificial intelligence involves developing machines and programs to perform human tasks. Such tasks may include visual and speech recognition and interpretation and decision making. Performing human tasks involves learning from experiences and data and adjusting based on new information. Artificial intelligence may involve processing large amounts of data and recognizing patterns in the data. The field of artificial intelligence has grown in part because of increased collection of and access to data and improvements in computing power and storage.

Machine learning is a branch of artificial intelligence. Machine learning is a technology that enables systems to learn and perform tasks without being manually programmed. Machine learning algorithms build or learn a mathematical model based on sample data. The mathematical model can make predictions or decisions without being explicitly programmed to perform the task. Machine learning may apply to situations where it is difficult or infeasible to manually develop a program to effectively perform the task because of the large amount of data and the number of variables involved.

Machine learning has application to many industries and problems. Examples may include financial services (such as credit scoring and stock trading), image processing (such as face recognition and object detection), healthcare (such as tumor detection and medical diagnosis), and natural language processing.

SUMMARY

In accordance with one aspect of the present disclosure, a method is disclosed for protecting against privacy attacks on machine learning models. The method includes training a machine learning model using a set of training data and causal relationship data, receiving a predefined privacy guarantee value, and adding an amount of noise to the machine learning model such that the machine learning model has a privacy guarantee value equivalent to or stronger than the predefined privacy guarantee value.

The causal relationship data may identify a subset of features that have a causal relationship with an outcome. The machine learning model may include a function from the subset of features to the outcome.

The predefined privacy guarantee value may be a differential privacy guarantee value.

The amount of noise may be added at a parameter level of the machine learning model.

The amount of noise may be added at an input level of the machine learning model.

The method may further include making the machine learning model available for use on test inputs from a second distribution. The set of training data may be from a first distribution. The first distribution may be different from the second distribution.

The method may further include receiving a first test input. The first test input may be part of the set of training data. The method may also include receiving a second test input. The second test input may not be part of the set of training data. The method may include providing a first output responsive to the first test input and providing a second output responsive to the second test input. The predefined privacy guarantee value may indicate a likelihood of inferring from the first output and the second output that the first test input is included in the set of training data.

The first output may include a first distribution of output scores. The second output includes a second distribution of output scores.

The first output and the second output may include one or more confidences for prediction.

The amount of noise may be less than a second amount of noise. The second amount of noise may be an amount necessary for a second machine learning model trained using the set of training data but not the causal relationship data to achieve a second privacy guarantee value equal to the privacy guarantee value.

The machine learning model may have a first accuracy. The first accuracy may be greater than a second accuracy of a second machine learning model trained using the set of training data but not the causal relationship data and having a second amount of noise added. The second amount of noise may be such that the second machine learning model has a second privacy guarantee value equivalent to the predefined privacy guarantee value.

The method may further include receiving a privacy attack. The privacy guarantee value may indicate a susceptibility to the privacy attack.

In accordance with another aspect of the present disclosure, a method for protecting against privacy attacks on machine learning models is disclosed. The method includes training a machine learning model using a set of training data and causal relationship data, receiving a predetermined accuracy level, and adding an amount of noise to the machine learning model such that the machine learning model has an accuracy level equal to or higher than the predetermined accuracy level. The machine learning model with the amount of noise may have a privacy guarantee value and the privacy guarantee value may be limited by the predetermined accuracy level.

The method may further include receiving a first test input. The first test input may be part of the set of training data. The method may also include receiving a second test input. The second test input may not be part of the set of training data. The method may include providing a first output responsive to the first test input and providing a second output responsive to the second test input. The privacy guarantee value may indicate a likelihood of inferring from the first output and the second output that the first test input is part of the set of training data.

The set of training data may be from a first distribution. The second test input may be from a second distribution. The first distribution may be different from the second distribution.

The privacy guarantee value of the machine learning model may be stronger than a second privacy guarantee value of a second machine learning model trained using the set of training data but not the causal relationship data and to which a second amount of noise has been added. The second amount of noise may be equal to the amount of noise.

A second machine learning model trained using the set of training data but not the causal relationship data and to which a second amount of noise added has been added may have a second accuracy level equivalent to the accuracy level. A second privacy guarantee value of the second machine learning model with the second amount of noise may be weaker than the privacy guarantee value of the machine learning model with the amount of noise.

In accordance with another aspect of the present disclosure, a system for protecting machine learning models from privacy attacks is disclosed. The system includes one or more processors, memory in electronic communication with the one or more processors, and instructions stored in the memory. The instructions may be executable by the one or more processors to receive training data. The training data may include private data. The instructions may be executable by the one or more processors to receive causal relationship data. The causal relationship data may be based on domain knowledge and may identify a subset of features included in the training data. The instructions may be executable by the one or more processors to train a model using the causal relationship data and the training data. The model may include a function from the subset of features to an outcome. The instructions may be executable by the one or more processors to add an amount of noise to the model. The instructions may be executable by the one or more processors to provide an output in response to a test input.

The causal relationship data may be a structural causal graph.

The test input may be part of a privacy attack. The test input may be from a test distribution different from a training distribution of the training data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Machine learning may enable computer systems to learn and perform tasks without being manually programmed. Machine learning algorithms may build or learn a mathematical model using sample (training) data. After the machine learning algorithm builds or learns the mathematical or machine learning model, the model may receive input and, in response, output a prediction or perform a task. For example, a machine learning model may be built to determine whether an incoming email message is spam. A machine learning algorithm may use past email messages to learn a model for determining whether an email message is spam. The model may then be deployed to predict whether new messages are spam. Machine learning may be helpful in situations where it is difficult or infeasible to manually develop a program to effectively perform a task because of the large amount of data and the number of variables involved.

The training data used to build a machine learning model may be a set of examples of the task or decision the model is to perform or make. The training data may include pairs of input data and an outcome (a target). The outcome may be a binary response, one of multiple categories, or a number value. The set of training data may be based on real-world observations and may be based on information received from a data source. As one example, training data may be based on hospital patient records. The patient records may include the patient's personal information, symptoms, and medical history. The patient records may also include the patient's diagnosis. A set of training data may include as at least part of its input data the patient's personal information, symptoms, and medical history. Each set of input data may include an associated target—the patient's diagnosis.

In certain situations, the training data may contain private or personally identifiable information. In some circumstances, it may also be that an individual's presence in the training data constitutes private information. For example, consider the training data described above that may be used to build a machine learning model for performing medical diagnosis. Further assume that the training data involves diagnosis of HIV. The hospitals and doctors, as well as the individuals themselves, would not want others to know whether a particular individual is included in a set of training data used to build a model for diagnosing HIV.

A machine learning algorithm may take training data and build a statistical or mathematical model for determining or predicting an output based on input data. The machine learning model may be a function that predicts one or more outputs or outcomes based on one or more inputs. The output may be a prediction about where a value falls on a continuous or defined spectrum. It may be a prediction about which of multiple classifications the input falls into. The output may also be a yes or no prediction. Building the model may involve finding patterns and associations in the training data. The model may include parameters (which may be variables that are associated with an output) and weights for the parameters. The machine learning algorithm may determine parameters and weights for the parameters based on the training data.

Once a machine learning model has been built (which may involve validation and testing in addition to training), it may be desirable to deploy the model to make predictions on new inputs not included in the training data. Sharing a machine learning model may, however, create privacy concerns. Even if only the model (and not the underlying training data) is shared, the model may still leak private data. A privacy leak (or breach) may occur when an adversary can use a model's output to infer the values of sensitive attributes of the training data. Stated another way, even where a person does not have access to the training data on which a machine learning model was built, the model may still make it possible for an adversary to learn about the contents of the training data. An adversary may try to learn information about the contents of training data by engaging in a privacy attack on the model. A privacy attack may involve an adversary feeding one or more inputs to the model and analyzing how a model responds. One example of a privacy attack is a membership inference attack. A membership inference attack attempts to infer whether a particular data sample was present in the training data.

A model may leak membership information in response to a membership inference attack as a result of overfitting. Overfitting may occur where a machine learning algorithm builds a model that fits too closely to a limited set of data. In other words, the machine learning algorithm may build a model based on relationships it identifies and understands from the training data but those relationships do not generalize to all data sets. One result of overfitting may be that the model is better at predicting outcomes for samples included in the training data than on new samples the model has not seen before. For example, a machine learning model trained on a set of training data associated with a first set of patients may be better at diagnosing patients included in the first set of patients than patients not included in the first set of patients. Performing better may mean that the model returns a higher confidence score for its prediction with respect to a known sample than for its prediction with respect to a new sample.

In situations where overfitting has occurred, an adversary may use a model's confidence for a prediction provided in response to a sample input to infer whether the sample is or is not a member of the training data. For example, consider a situation where an adversary provides two samples to a model. If the model gives a higher confidence for a prediction associated with a first sample than for a prediction associated with a second sample, the adversary may infer that the first sample is a member of the training data. Another version of a membership inference attack may involve the use of an attack model and one or more shadow models intended to behave similar to the model being attacked. The shadow models may be used to teach the attack model how to distinguish the one or more shadow models' outputs on members of their training datasets from their outputs on non-members.

A machine learning model may be even more susceptible to membership inference attacks where the model is used to predict outcomes for samples that are not only new (i.e., previously unseen by the model) but are also from a different distribution than the training data used to build the model. When samples come from a different distribution, a distribution shift may occur. In that case, the difference in confidence a model gives for predictions associated with samples from the training set and samples from the new distribution is even greater than when the sample is simply a previously unseen sample but from the same distribution as the training set. For example, consider a situation where the training data is patient data from an original hospital and the model is shared with a different hospital in a different part of the country. A sample from the different hospital is not only a new person the model has not seen before but is a person associated with a hospital that may have a completely different demographic than the original hospital used to build the model. As a result, the confidence of the model for predictions for patients at the different hospital may be lower than predictions for new patients at the original hospital (which may already be lower than the confidence for patients from the training data in the original hospital).

To better protect machine learning models from privacy attacks (such as membership inference attacks) machine learning models can be trained using causal relationships between input variables (features) and an outcome represented in the training data. Training machine learning models using causal relationships makes the machine learning model more invariant to the training distribution. As a result, machine learning models trained using causal relationships (which may be referred to as causal models) generalize better to shifts between samples from the same distribution and shifts between samples from different distributions. Causal models achieve similar accuracy on data from different domains and distributions. In this context, the accuracy of a particular model may indicate how frequently a prediction made by the model is correct. At least in part because of their invariance to the training distribution, causal models provide stronger protection against privacy attacks than models trained without causal relationships (which may be referred to as correlational models). Correlational models may be susceptible to privacy attacks such as the membership inference attack where the adversary may correctly identify whether an input is from the training dataset 80% of the time, under different test distributions and sample sizes. In comparison, for causal models, the adversary's ability to correctly identify whether an input is from the training dataset may be close to a random guess. Obtaining information about causal relationships may, however, be difficult and time consuming. It may require consultation with domain experts, the study of multiple training datasets from different distributions, or a combination of randomized experiments and observed data.

Adding noise to causal models may further strengthen them against privacy attacks. Adding noise to a machine learning model may reduce the accuracy of the machine learning model but reduce the likelihood that an adversary can use a privacy attack to learn information about the training data. There may be different ways to add noise to a machine learning model. Noise can be added to a model at the input level (such as by adding randomized inputs to the training data). Noise can be added to a model at the parameter level after the model has been trained. Noise can also be added at the output level (such as adding noise to the output confidence). The amount of noise added and the level or step at which noise is added may impact how much the accuracy of the model is reduced and how much less likely it is that the model will be susceptible to a privacy attack. For example, adding noise at the input level may reduce accuracy more than adding noise to model parameters.

The robustness of a machine learning model against privacy attacks may be referred to as a privacy guarantee of the machine learning model. In other words, the privacy guarantee may be a value that represents a likelihood that an adversary can infer information about the training data using a privacy attack. One type of privacy guarantee may be a differential privacy guarantee. A differential privacy guarantee may be a measure of how much an output from a model changes based on the presence or absence of a single data point in the training dataset. For example, assume two training datasets that differ by one sample. A differential privacy guarantee may represent a probability of being able to tell which training dataset a model was trained on, based on probing outputs of the model. If a single data point does not change what the model learns from the training data, then the model does not memorize the information contained in that data point, and the privacy of the individual who contributed the data point is respected. Thus, a stronger differential privacy guarantee may indicate an adversary is less likely to be able to tell whether a particular sample is present or not present in the training data.

A differential privacy guarantee may include an epsilon parameter. The epsilon ($\epsilon$) parameter may measure the strength of a differential privacy guarantee. The $\epsilon$ for a differential privacy guarantee may give an upper bound on the probability of a particular model output varying as a result of including (or removing) a single training example. The smaller the epsilon, the stronger the differential privacy guarantee. For example, a differential privacy guarantee ($\epsilon$) of 0 may mean a model's output distributions do not change at all based on a single difference in the training data. An epsilon of 1 may mean someone can differentiate output distributions with some probability.

Training a machine learning model using training data and information about causal relationships may result in the machine learning model having a stronger differential privacy guarantee (a smaller epsilon) as compared to training a second machine learning model using the same training data but not information about causal relationships. Causal models are more robust to membership inference attacks than typical correlational models such as neural networks.

Adding noise to a machine learning model may reduce the epsilon of the machine learning model. A data provider (such as the source of training data) may request that any model trained using the data provider's data have a predefined epsilon value. The predefined epsilon value may determine how much noise must be added to a model. The predefined epsilon value places a limit on the differential privacy violation the model can do. Adding noise to a model to achieve the predefined epsilon value may put a ceiling on the accuracy the model can achieve. Adding the same amount of noise to a causal model and a correlational model that were both trained on the same training data results in the causal model having a stronger privacy guarantee and better accuracy than the correlational model. In other words, for the same amount of added noise, models learned using causal structure provide stronger $\epsilon$-differential privacy guarantees than corresponding correlational models.

The amount of noise needed to reduce the epsilon of a causal model to a predefined amount is less than a second amount of noise needed to reduce the epsilon of a correlational model that was trained on the same training data to the same predefined amount. In other words, less noise needs to be added to a causal model than a correlational model trained on the same training data in order for both models to have the same predefined epsilon. The causal model with noise added to achieve the predefined epsilon will have better accuracy than the correlational model with noise added to achieve the same predefined epsilon. Similarly, adding noise to a causal model and a correlational model trained on the same training data in order to achieve the same accuracy for both the causal model and the correlational model will result in the causal model having a lower epsilon than the correlational model.

The techniques described may improve on other approaches to dealing with privacy attacks. Modifying the loss function or other parts of a correlational model are brittle to changes in data distribution, which are common in real-world scenarios. Generalization techniques such as adding learning rate decay or dropout or using adversarial regularization techniques assume that the test data is from the same distribution as the training dataset. But in practice, a model trained using data from one distribution is often used on a different distribution. Training models using causal relationships and adding noise to resulting models extends the scope of membership privacy to different distributions and thus realistic scenarios. Where the test distribution may not be the same as the training distribution, a membership inference attack on a causal model may be successful on roughly 50% of the test inputs (close to a random guess), whereas the same attack on a correlational model may be successful for 80% of the test inputs.

The techniques described can have practical significance for use and adoption of machine learning in healthcare and other domains with private and sensitive data. They improve the robustness of machine learning models against privacy attacks while the machine learning model maintains strong accuracy and generalizes well to different data distributions. The techniques may incentivize more data sources (such as hospitals and banks) to provide sensitive data for use in building machine learning models and to allow machine learning models built using their data to be used by others.

Figure 1:
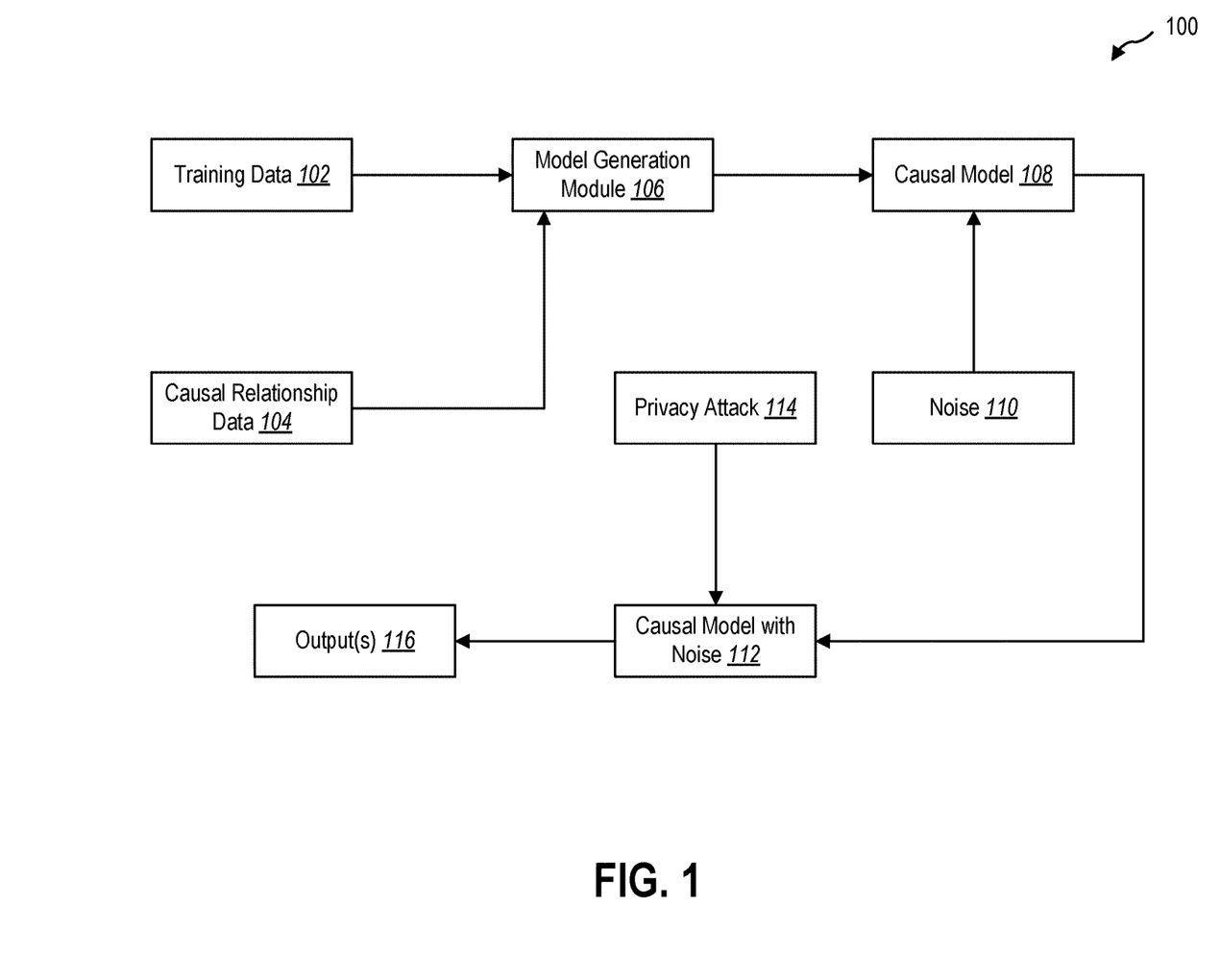
FIG. 1 illustrates an example system for protecting machine learning models from privacy attacks.

FIG. 1 represents an example system 100 for protecting machine learning models from a privacy attack 114.

The system 100 may include training data 102. The training data 102 may include pairs of input vectors (or scalars) and corresponding output vectors (or scalars). A variable included in the input may be referred to as a feature. An output may be referred to as a target (or a label). The training data 102 may contain information associating an outcome or decision with one or more variable values. The outcome may be a binary outcome, a range of outcomes, or value that can fall on a spectrum. An example of a binary outcome may be whether an email is spam. An example of a range of outcomes may be the type of product a potential customer is likely to be interested in. An example of a numeric value outcome may be the market value of a particular piece of real estate. With respect to the real estate value example, the features associated with each target in the training data 102 may include square footage, year built, geographic location, lot size, number of bedrooms, number of bathrooms, etc. And for each set of features, the output may be a market value for the property.

The training data 102 may be based on information obtained from or collected by a data source. Examples of data sources may be hospitals, banks, government institutions, weather stations, etc. The training data 102 may be based on real-world observations. Preparing the training data 102 may involve formatting, validating, modifying, or engineering information obtained from a data source.

The training data 102 may be from a single distribution or from multiple distributions. A distribution may be a collection of data. A distribution may be a function that describes all the possible values of features contained in the training data 102 and how frequently each value occurs in the training data 102. A distribution may be a table or function that links every possible value of a feature to a probability that the value occurs. Data collected at one location may have a different distribution than data collected at a second location. For example, data collected at a first hospital in a first region may have a particular distribution with respect to age, ethnicity, family history of cancer, tobacco use, etc. that is different from data collected at a second hospital in a second region.

The system 100 may include causal relationship data 104. The causal relationship data 104 may identify a subset of features contained in the training data 102 that have a causal relationship with the outcome. The causal relationship data 104 may be based on domain knowledge and experience, causal features learned from multiple training datasets from different distributions, or a combination of randomized experiments and observed data. In FIG. 1, the causal relationship data 104 is shown separate from the training data 102. It may be, however, that training data 102 includes the causal relationship data 104 or is structured according to causal relationship data 104.

The causal relationship data 104 may be organized as a structural causal graph. The causal relationship data 104 may define causal features as parents of the outcome under the graph. When organized as a structural causal graph, the causal relationship data 104 may include nodes that represent variables and directed edges that represent direct causal relationships from a source to a target node. The causal relationship data 104 may be different from probabilistic graphical models in which an edge conveys an associational relationship.

The system 100 may include a model generating module 106. The model generating module 106 may be designed to build a machine learning model. The model generating module 106 may include a machine learning algorithm for training a machine learning model. The model generating module 106 may also include validation and testing. The model generating module 106 may include other data engineering and refining processes. Those skilled in the art will recognize that many different kinds of machine learning methods and algorithms may be utilized to create a machine learning model in accordance with the present disclosure.

The model generating module 106 may receive the training data 102 and the causal relationship data 104 and build a causal model 108. The causal model 108 may be based at least in part on the training data 102 and the causal relationship data 104. The model generating module 106 may use the training data 102 and the causal relationship data 104 to identify a subset of features in the training data 102 that have a causal relationship with the outcome and learn a function describing the outcome based on the subset of features. The subset of features may be identified in the causal relationship data 104.

The model generating module 106 may be implemented as a service through a cloud platform. A cloud platform may be a system with a front end and a back end that communicate through the Internet. The front end may include an interface accessible to a user through a client device. The back end may include computing resources and applications. A customer with data may access the cloud platform through a user interface and upload the customer's data to the cloud platform. The back end of the cloud platform may have computing resources and applications (bundled together as a service) that build a machine learning model using the data. The service may make the machine learning model available to or accessible by the customer. The machine learning model may be a black-box application program interface (API).

The causal model 108 may be a machine learning model that produces outputs or makes predictions that depend only on the causal relationship(s) between the input features and the outcomes instead of just the associations between the input features and the outcomes. The causal relationship(s) between the features and the outcome may be invariant to the distribution of the features. The causal model 108 may generalize well to samples not contained in the training data 102 and to samples from a distribution different from a distribution of the training data 102.

The causal model 108 may be any of a number of different types of machine learning models. For example, the causal model 108 may be a binary classification, a multiclass classification, or a regression model. A binary classification model may predict a binary outcome. A multiclass classification model may predict one of two or more outcomes. A regression model may predict a numeric value.

The system 100 may include noise 110. The noise 110 may represent random data. The noise 110 may be added to the causal model 108. Adding the noise 110 to the causal model 108 may reduce the accuracy of the causal model 108. Adding the noise 110 to the causal model 108 may improve the robustness of the causal model 108 against privacy attacks.

The noise 110 may be a specific amount of noise. The amount of the noise 110 added to the causal model 108 may be based on a desired level of protection against privacy attacks. For the causal model 108 to have the desired level of protection against privacy attacks may require that the noise 110 added to the causal model 108 be at or more than a specific amount of noise.

The desired level of protection against privacy attacks may be measured in terms of a differential privacy guarantee. A stronger differential privacy guarantee may indicate an adversary is less likely to be able to tell whether a particular sample is present or not present in the training data. A differential privacy guarantee may include an epsilon parameter. The epsilon (E) parameter may measure the strength of a differential privacy guarantee. The E for a differential privacy guarantee may give an upper bound on the probability of a particular model output varying as a result of including (or removing) a single training example. The smaller the epsilon, the stronger the differential privacy guarantee.

The amount of the noise 110 added to the causal model 108 may be based on a desired accuracy level. The accuracy of the causal model 108 may represent how frequently the causal model 108 makes a correct prediction in response to an input.

The noise 110 may be added to the causal model 108 in different ways. The noise 110 can be added at an input level of the causal model 108 (such as by adding randomized inputs to the training data 102). The noise 110 can be added to parameters of the causal model 108 after the causal model 108 has been trained. The noise 110 can also be added at an output level of the causal model 108. The level or step at which the noise 110 is added may impact the accuracy of the model and the likelihood that a model will be susceptible to privacy attacks. For example, adding the noise 110 to the training data 102 may reduce accuracy of the causal model 108 more than adding the noise 110 to model parameters of the causal model 108.

The causal model 108 with the noise 110 may be represented by a causal model with noise 112. The causal model with noise 112 may be less accurate than the causal model 108. But the causal model with noise 112 may have a stronger privacy guarantee than the causal model 108.

A privacy attack 114 may originate from an adversary. The adversary may not have access to the training data 102. The privacy attack 114 may be any method or process that the adversary may use to infer information about the training data 102. The privacy attack 114 may attempt to use one or more outputs 116 from the causal model with noise 112 (and potentially other information) to infer information about the training data 102. The one or more outputs 116 may include a prediction (outcome) responsive to one or more inputs. The one or more outputs 116 may include a confidence score associated with the prediction. A prediction may include a range of possibilities and a probability associated with each possibility. The one or more outputs 116 may include parameter level information.

There are various ways to carry out the privacy attack 114. One example of a privacy attack 114 is a membership inference attack. A membership inference attack may be an attempt to determine whether a particular sample is present in the training data 102. One example of a membership inference attack may involve sending a first test input and a second test input to the causal model with noise 112. The first test input may be different from the second test input. The first test input may be a sample contained in the training data 102. The second test input may be a sample not contained in the training data 102. The one or more outputs 116 may include a first output responsive to the first test input and a second output responsive to the second test input. The first output may include a first confidence value, and the second output may include a second confidence value. An adversary may attempt to infer whether the first test input is a member of the training data 102 based on a difference in the first confidence value and the second confidence value.

There may be multiple variants of a membership inference attack depending on the information accessible to the adversary. An adversary with access to a black-box model may see only the confidence scores for the predicted output. In that situation, a membership attack may be possible whenever the distribution of output scores for training data is different from the test data. An adversary with access to a white-box model may have access to model parameters and observe output at each layer in the model. In that situation, if an adversary knows a true label for a target input, then the adversary may guess the input to be a member of the training data set whenever the loss is lower. Alternatively, if the adversary knows the distribution of the training inputs, the adversary may learn a "shadow" model based on synthetic inputs and use the shadow model's output to build a membership classifier for any new input.

One way to define a membership attack may be as follows. Let M be a model trained on a dataset $\mathcal{D}(X, Y)$ of size N. Let $\mathcal{A}$ be an adversary with access to model M and a test input X. The advantage of an adversary in membership inference is the difference between true and false positive rate in guessing whether the input belongs to the training set.

$$Adv(\mathcal{A}, M) = Pr[\mathcal{A} = 1 | b=1] - Pr[\mathcal{A} = 1 | b=0]$$

where b=1 if the input is in the training set and 0 otherwise.

Proposed methods for protecting machine learning models from membership inference attacks focus on situations where test inputs come from the same data distribution as a training set (such as the training data 102). When test inputs come from the same distribution as a training set, methods to reduce overfitting (such as adversarial regularization) may help reduce the risk of privacy leaks in response to privacy attacks. But, in practice, test inputs may not come from the same data distribution as training data. For instance, in an example model trained to detect HIV, the test inputs may come from different hospitals. Models trained to reduce the generalization error for a specific test distribution are susceptible to membership inference when the distribution of features is changed. This result may be due to covariate shift and concept drift that introduce a domain adaption error term. That is, the function $f$ mapping X to Y changes, and thus, any hypothesis that minimizes loss to $f$ may no longer be optimal on the new test distribution.

One way to overcome these limitations is to train a machine learning model using not only training data but also causal relationship data (such as the causal relationship data 104). Using causal relationship data results in a machine learning model that is invariant across input distributions. Furthermore, adding noise (such as the noise 110) to a machine learning model (such as the causal model 108) may further strengthen the machine learning model against privacy attacks. And adding noise to a causal model (such as the causal model 108) reduces accuracy more slowly than adding noise to a correlational model.

Figure 2:
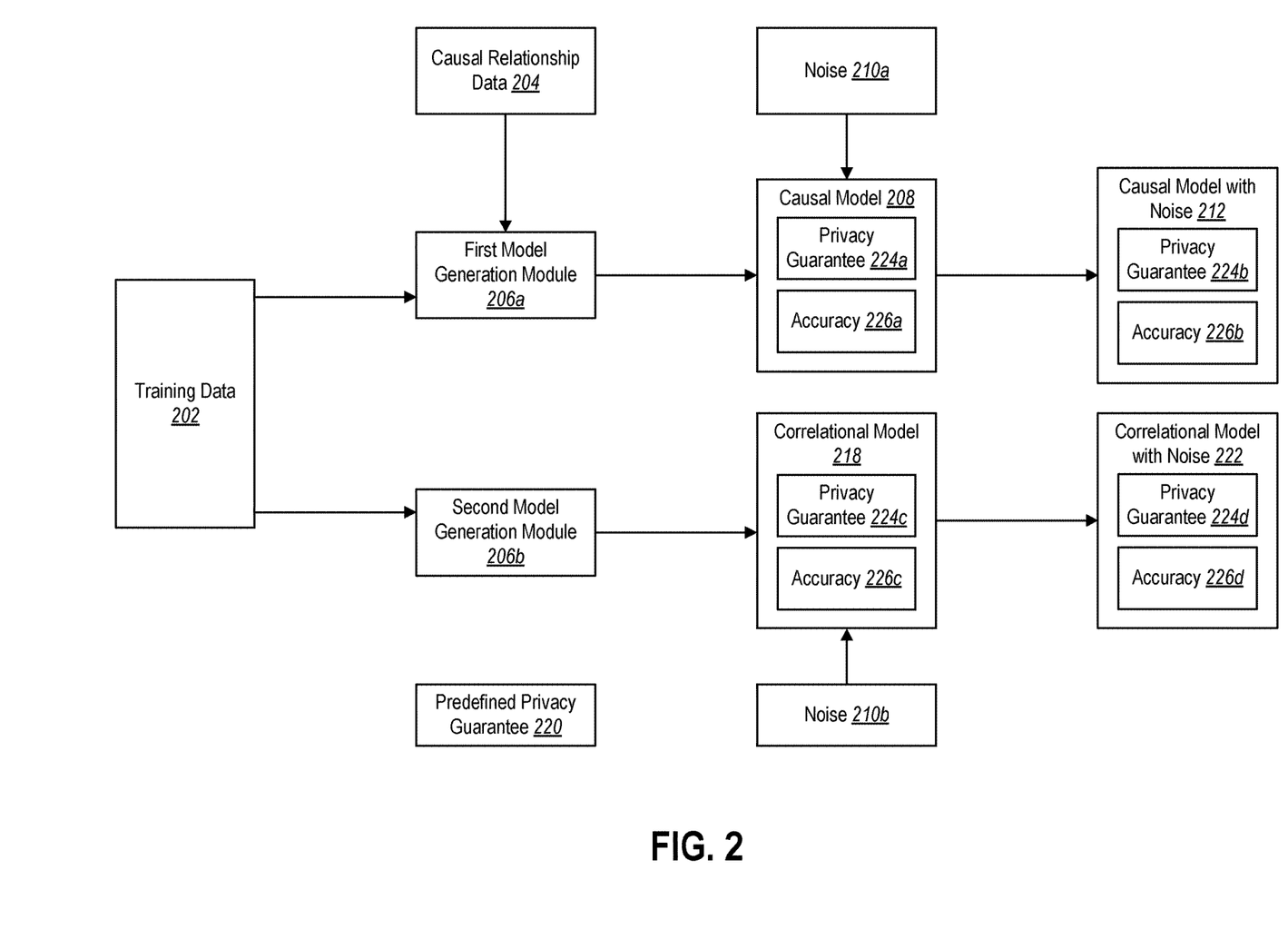
FIG. 2 illustrates an example of how the techniques described improve a privacy guarantee of a machine learning model.

FIG. 2 illustrates examples of how the techniques described improve the robustness of machine learning models against privacy attacks.

A first model generation module 206a may receive training data 202 and causal relationship data 204. The first model generation module 206a may build a causal model 208 based on the causal relationship data 204 and the training data 202. The causal model 208 may have a privacy guarantee 224a and an accuracy 226a.

A second model generation module 206b may receive the training data 202. The second model generation module 206b may not receive the causal relationship data 204. The second model generation module 206b may build a correlational model 218 using the training data 202. The correlational model 218 may have a privacy guarantee 224c and an accuracy 226c.

The privacy guarantees 224a, 224c may be differential privacy guarantees. A differential privacy guarantee may be a measure of how much the output of a machine learning model changes in response to the presence or absence of a single data point in the training dataset. Differential privacy may be defined as a mechanism $\mathcal{M}$ with domain I and range O satisfies $\epsilon$-differential privacy if for any two datasets d, d'$\in$I that differ only in one input and for a set S$\subseteq$O, the following holds: $Pr(\mathcal{M}(d) \in S) \le e^\epsilon Pr(\mathcal{M}(d') \in S)$.

Where the privacy guarantees 224a, 224c are differential privacy guarantees, the privacy guarantee 224a of the causal model 208 is stronger than the privacy guarantee 224c of the correlational model 218. The strength of a privacy guarantee may indicate a likelihood that a privacy attack on a machine learning model can determine whether a sample is a member of the data used to train the model (such as the training data 202). Thus, the causal model 208 may be less susceptible to privacy attacks than the correlational model 218.

The accuracies 226a, 226c may indicate how frequently a prediction made by the causal model 208 and the correlational model 218, respectively, are correct. For example, if the causal model 208 predicts 95 of 100 outcomes correctly, then the accuracy 226a may be 95%. Other ways of measuring accuracy are known in the art.

Noise 210a may be added to the causal model 208. Adding the noise 210a to the causal model 208 may result in a causal model with noise 212. The causal model with noise 212 may have a privacy guarantee 224b and an accuracy 226b. The privacy guarantee 224b may have a value different from the privacy guarantee 224a. The accuracy 226b may have a value different from the accuracy 226a.

Adding the noise 210a to the causal model 208 may result in the privacy guarantee 224b of the causal model with noise 212 being stronger than the privacy guarantee 224a of the causal model 208. The difference in strength between the privacy guarantee 224b and the privacy guarantee 224a may depend on an amount of the noise 210a and how the noise 210a is added to the causal model 208. (Although FIG. 2 shows the noise 210a being added to the causal model 208 after the first model generation module 206a has built the causal model 208, it is also possible to add the noise 210a to the training data 202. It is also possible to add the noise 210a at an output level of the causal model 208.) Increasing the amount of the noise 210a may increase the difference in strength between the privacy guarantee 224b and the privacy guarantee 224a. The greater the amount of the noise 210a, the stronger the privacy guarantee 224b becomes as compared to the privacy guarantee 224a of the causal model 208.

Adding the noise 210a to the causal model 208 reduces the accuracy 226a such that the accuracy 226b of the causal model with noise 212 is less than the accuracy 226a of the causal model 208. The difference between the accuracy 226a and the accuracy 226b may depend on the amount of the noise 210a and how the noise 210a is added to the causal model 208. Increasing the amount of the noise 210a may increase the difference between the accuracy 226a and the accuracy 226b. The greater the amount of the noise 210a, the lower the accuracy 226b becomes as compared to the accuracy 226a of the causal model 208.

Noise 210b may be added to the correlational model 218. Adding the noise 210b to the correlational model 218 may result in a correlational model with noise 222. The correlational model with noise 222 may have a privacy guarantee 224d and an accuracy 226d. The privacy guarantee 224d may have a value different from the privacy guarantee 224c. The accuracy 226d may have a value different from the accuracy 226c.

Adding the noise 210b to the correlational model 218 may result in the privacy guarantee 224d of the correlational model with noise 222 being stronger than the privacy guarantee 224c of the correlational model 218. The difference in strength between the privacy guarantee 224d and the privacy guarantee 224c may depend on an amount of the noise 210b and how the noise 210b is added to the correlational model 218. Increasing the amount of the noise 210b may increase the difference in strength between the privacy guarantee 224d and the privacy guarantee 224c. The greater the amount of the noise 210b, the stronger the privacy guarantee 224d becomes as compared to the privacy guarantee 224c of the correlational model 218.

Adding the noise 210b to the correlational model 218 reduces the accuracy 226c such that the accuracy 226d of the causal model with noise 222 is less than the accuracy 226c of the correlational model 218. The difference between the accuracy 226c and the accuracy 226d may depend on the amount of the noise 210b and how the noise 210b is added to the correlational model 218. Increasing the amount of the noise 210b may increase the difference between the accuracy 226c and the accuracy 226d. The greater the amount of the noise 210b, the lower the accuracy 226d becomes as compared to the accuracy 226c of the correlational model 218.

If the noise 210a and the noise 210b are equal in amount, the privacy guarantee 224b of the causal model with noise 212 will be stronger than the privacy guarantee 224d of the correlational model with noise 222. Moreover, the accuracy 226 of the causal model with noise 212 will be greater than the accuracy 226d of the correlational model with noise 222.

The amount of the noise 210a added to the causal model 208 may be based on a predefined privacy guarantee 220. The predefined privacy guarantee 220 may have a value defined by a data provider. The data provider may have provided data included in the training data 202. The data provider may require that any model trained on its data have a predefined and specified privacy guarantee value, such as the predefined privacy guarantee 220. The noise 210a may need to be at least a certain amount in order for the causal model with noise 212 to have the privacy guarantee 224b equal to or greater than the predefined privacy guarantee 220. If the privacy guarantee 224b is equal to the predefined privacy guarantee 220, the predefined privacy guarantee 220 may limit the accuracy 226b.

The amount of the noise 210b that must be added to the correlational model 218 in order for the privacy guarantee 224d of the correlational model with noise 222 to be equal to the predefined privacy guarantee 220 is greater than the amount of the noise 210a that must be added to the causal model 208 in order for the privacy guarantee 224b of the causal model with noise 212 to be equal to the predefined privacy guarantee 220. In this situation, the difference between the accuracy 226c and the accuracy 226d may be greater than the difference between the accuracy 226a and the accuracy 226b.

Causal models may provide stronger differential privacy guarantees than corresponding correlational models. Consider M arbitrary teacher models that are trained on a separate subsample of the dataset without replacement. Then, train a student model on some auxiliary unlabeled data with the (pseudo) labels generated from a majority vote of the teachers. Differential privacy can be achieved by either perturbing the number of votes for each class or perturbing the learnt parameters of the student model. The privacy guarantees are better if a larger number of teacher models agree on each input because by definition the majority decision could not have been changed by modifying a single data point (or a single teacher's vote). For a fixed amount of noise, a causal model is $\epsilon_c$-DP compared to $\epsilon$-DP for a correlational model, where $\epsilon_c \le \epsilon$.

Theorem 2. Let $\mathcal{D}$ be a dataset generated from possibly a mixture of different distributions Pr(X, Y) such that Pr(Y|$X_C$) remains the same. Let $n_j$ be the votes for the jth class from M teacher models. Let $\mathcal{M}$ be the mechanism that produces a noisy max, arg $\max_j \{n_j + \text{Lap}(2/\gamma)\}$. Then the privacy budget E for a causal model is lower than that for the correlational model, for the same $\mathcal{M}$.

Proof. Consider a change in a single input example (x, y), leading to a new D' dataset. Because sub-datasets are sampled without replacement, only a single teacher model can change in D'. Let $n'_j$ be the vote counts for each class under D'. Because the change in a single input can affect only one model's vote, $|n_j - n'_j| \le 1$.

Let the noise added to each class be $r_j$ Lap(2/γ). Let the majority class (class with the highest votes) using data from D be i and the class with the second largest votes be j. Consider the minimum noise r* required for class i to be the majority output under $\mathcal{M}$ over D. Then $$n_i + r^* > n_j + r_j$$

For i to have the maximum votes using $\mathcal{M}$ over D' too, it is necessary for $$n'_i + r_i > n'_j + r_j$$

In the worst case, $n'_i = n_i - 1$ and $n'_j = n_j + 1$ for some j. Thus, it is necessary for $$n_i - 1 + r_i > n_j + 1 + r_j => n_i + r_i > n_j + 2 + r_j$$

which shows that $r_i > r^* + 2$. Note that $r^* > r_j - (n_i - n_j)$. There are two cases.

CASE I: The noise $r_j < n_i - n_j$, and therefore $r^* < 0$. Writing $Pr(i|D')$ to denote the probability that class i is chosen as the majority class under D', $$P(i|D) = P(r_i \geq r^* + 2)$$
$$= 1 - \exp(\gamma)(1 - P(r_i \geq r^*))$$
$$= 1 - 0.5\exp(\gamma)\exp\left(\frac{1}{2}\gamma r^*\right)$$
$$= 1 - \exp(\gamma)(1 - P(i|D))$$

where the equations on the right are due to Laplace c.d.f. Using the above equation, it can be written:

$$\frac{P(i|D')}{P(i|D)} = \exp(\gamma) + \frac{1 - \exp(\gamma)}{P(i|D)} = \exp(\gamma) + \frac{1 - \exp(\gamma)}{P(r_i \geq r^*)} \leq \exp(\epsilon)$$

for some $\epsilon > 0$. As $P(i|D) = P(r_i \geq r^*)$ increases, the ratio decreases and thus the effective privacy budget ($\epsilon$) decreases. Thus, a model with a lower $r^*$ (effectively higher $|r^*|$) will exhibit the lowest $\epsilon$.

Below it is shown that $|r^*|$ is higher for a causal model, and thus $P(r_i \geq r^*)$ is higher. Intuitively, $|r^*|$ is higher when there is more consensus between the M teacher models because $|r^*|$ is the difference between the votes for the highest voted class with the votes for the second-highest class.

Consider two causal teacher models $h1_c$ and $h2_c$, and two correlational teacher models, h1 and h2. From Corollary 2 (described later), for any new x, and for similar accuracies of the models, there is more consensus among causal models.

$$P(h1_c(x) = h2_c(x)) \geq P(h1(x) = h2(x))$$

Hence $r^*_c \leq r^*$. It follows from the work above that $\epsilon_c \leq \epsilon$.

CASE II: The noise $r_j \geq n_i - n_j$, and therefore $r^* \geq 0$. Following the steps above, the following can be obtained:

$$P(i|D) = P(r_i \geq r^* + 2)$$
$$= \exp(-\gamma)(P(r_i \geq r^*))$$
$$= 0.5 \exp(-\gamma)\exp\left(-\frac{1}{2}\gamma r^*\right)$$
$$= \exp(-\gamma)(P(i|D))$$

Thus, the ratio does not depend on $r^*$.

$$\frac{P(i|D')}{P(i|D)} = \exp(-\gamma)$$

Under CASE II when the noise is higher to the differences in votes between the highest and second-highest voted class, causal models provide the same privacy budget as correlational models. Thus, overall, $\epsilon_c \leq \epsilon$.

When datasets from different domains are given, the above theorem also provides a constructive proof to generate a differentially private causal algorithm.

Returning to the concept of differential privacy and privacy attacks, consider the following.

Lemma 1. Let $\mathcal{M}$ be a $\epsilon$-differentially private mechanism based on a model M. The membership advantage for an adversary is bounded by $\exp(\epsilon) - 1$.

Theorem 3. Given a dataset $\mathcal{D}(X, Y) \sim P$ of size N and a structural causal network that connects X to Y, a causal model yields lower membership advantage than a correlational model even when the test set is from a different distribution $\in P^*$ than the train set.

Proof. From Theorem 2 above, it is possible to construct an $\epsilon_c$-DP mechanism based on a causal model, and a $\epsilon$-DP mechanism based on a correlational model, where $\epsilon_c \leq \epsilon$. Further, this construction works for different input distributions. From Lemma 1:

$$Adv(\mathcal{A}, \mathcal{M}_C) \leq \exp(\epsilon_c) - 1 \quad Adv(\mathcal{A}, \mathcal{M}) \leq \exp(\epsilon) - 1$$

Thus, worst case advantage for a causal model is always lower than that of a correlational model.

Corollary 3. As sample size $N \to \infty$, using a consistent estimator h, $L_c(h, f_P^*) \to 0$ and thus membership advantage $Adv(\mathcal{A}, M_c) \to 0$ for a causal model.

Proof. From Theorem 1, $L_c(h, f_P^*) = L_c(h, f_P)$. As $N \to \infty$, $h \to f_P$ as h is a consistent estimator. Because the global minimizer $f_P$ does not depend on any training set, $h(x) = E[Y|X=x]$ $$Adv(\mathcal{A}, M_C) = Pr(\mathcal{A} = 1 | b = 1) - Pr(\mathcal{A} = 1 | b = 0)$$
$$= E[\mathcal{A} | b = 1] - E[\mathcal{A} | b = 0]$$
$$= E[\mathcal{A}(h) | b = 1] - E[\mathcal{A}(h) | b = 0]$$
$$= E[\mathcal{A}(h)] - E[\mathcal{A}(h)] = 0$$

where the second last equality follows because any function of h is independent of the training dataset.

Membership advantage does not go to zero as $N \to \infty$ for correlational models. For correlational models, $L_c(h, f_{P^*}) = L_c(h, f_P) + L(f_{P^*}, f_P)$, where the second term represents the distance between distributions $P^*$ and P and thus does not converge to zero.

Figure 3:
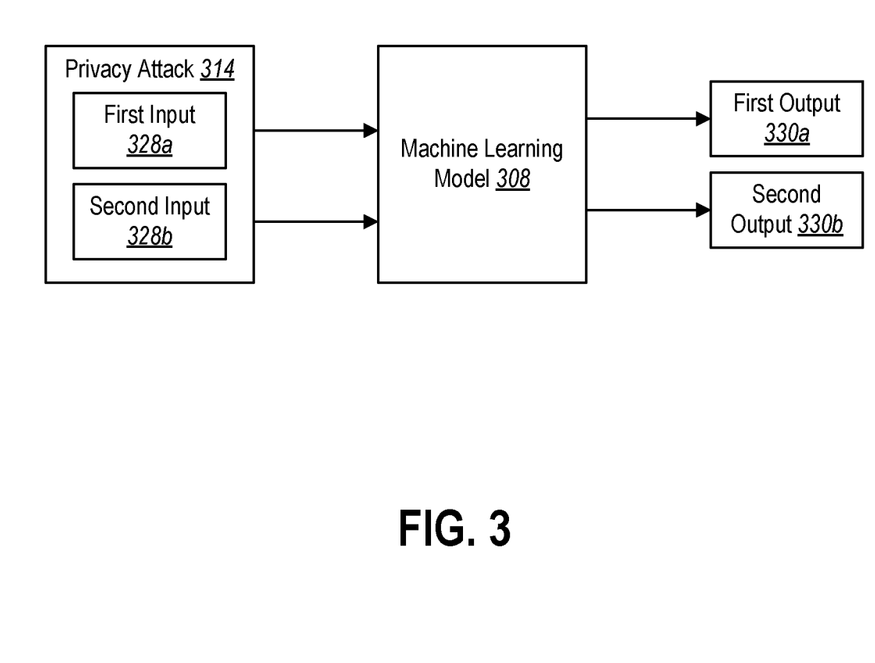
FIG. 3 illustrates an example of a privacy attack on a machine learning model.

FIG. 3 illustrates a potential example of a privacy attack 314 on a machine learning model 308. FIG. 3 illustrates just a single example. Those skilled in the art will recognize that other forms of privacy attacks exist.

The privacy attack 314 may include a first input 328a and a second input 328b. The privacy attack 314 may provide the first input 328a to the machine learning model 308. In response to the first input 328a, the machine learning model 308 may produce a first output 330a. The privacy attack 314 may provide the second input 328b to the machine learning model 308. The machine learning model 308 may produce a second output 330b in response to the second input 328b.

The first output 330a may include a first prediction based on the machine learning model 308 and the first input 328a. The second output 330b may include a second prediction based on the machine learning model 308 and the second input 328b. The first output 330a may include a first confidence score associated with the first prediction. The second output 330b may include a second confidence score associated with the second prediction. The first confidence score and the second confidence score may be a scalar or a vector with multiple elements. The first output 330a may include a first set of probabilities for a set of possible outcomes. The second output 330b may include a second set of probabilities for the set of possible outcomes. The first output 330a may include a first distribution of output scores and the second output 330b may include a second distribution of output scores.

The first input 328a may be a member of a training dataset used to build the machine learning model 308. The second input 328b may not be a member of the training dataset used to build the machine learning model 308.

The privacy attack 314 may attempt to infer from the first output 330a and the second output 330b whether the first input 328a is a member of the training dataset used to build the machine learning model 308. For example, the privacy attack 314 may attempt to infer whether the first input 328a is a member of the training dataset based on differences in the first prediction and the second prediction. The privacy attack 314 may attempt to infer whether the first input 328a is a member of the training dataset based on differences between the first confidence score and the second confidence score. The privacy attack 314 may attempt to infer whether the first input 328a is a member of the training dataset based on differences between the first set of probabilities and the second set of probabilities. The privacy attack 314 may attempt to infer whether the first input 328a is a member of the training dataset based on differences between the first distribution of output scores and the second distribution of output scores.

Figure 4A:
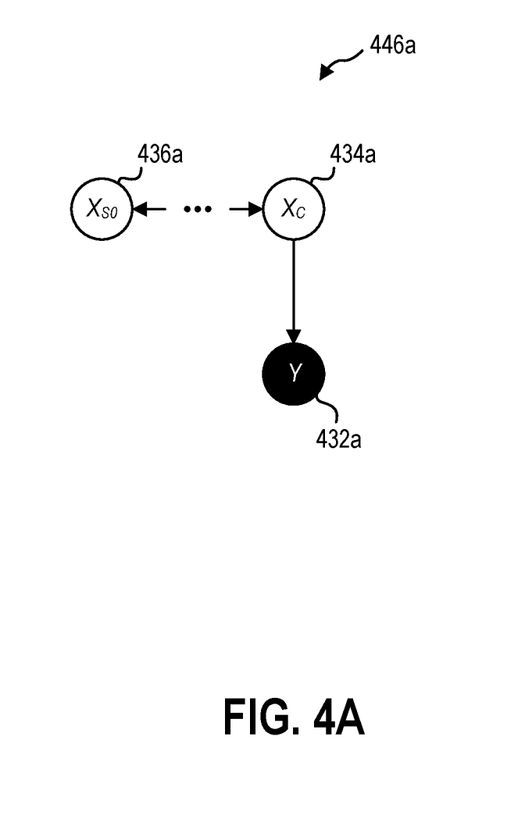
FIGS. 4A-4C illustrates an example of a structural causal graph that may be used as part of training a machine learning model.
Figure 4B:
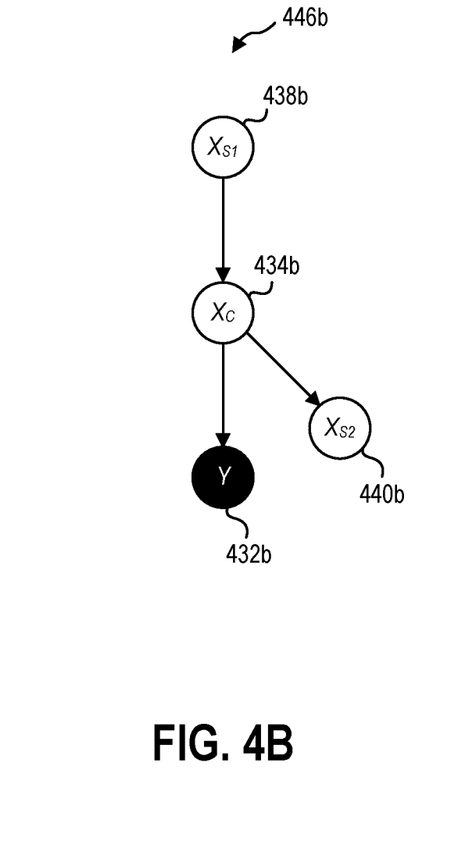
Figure 4C:
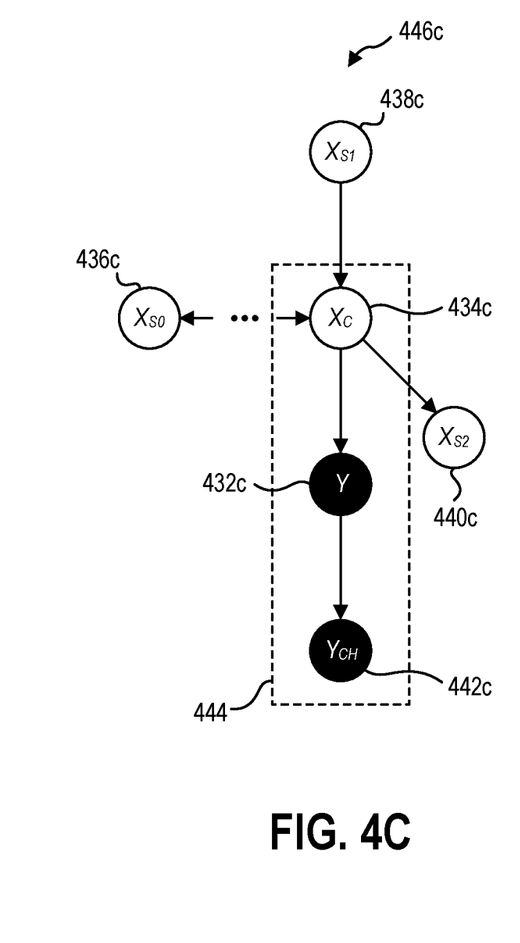

FIGS. 4A-4C illustrate examples of structural causal graphs 446a, 446b, and 446c.

A structural causal graph may define causal features as parents (or more generally a Markov Blanket) of the outcome under the graph. Consider data from a distribution (X, Y)~P where X is a k-dimensional vector and Y∈{0, 1}. A structural causal graph may be used as part of learning a function h(X) that predicts Y. Nodes of a structural causal graph may represent variables and a directed edge may represent a direct causal relationship from a source to a target node. Consider that $X_C \subset X$. The structural causal graphs 446a, 446b, 446c may be structural causal graphs that denote the different relationships between X and Y.

The structural causal graph 446a shows a scenario where X contains variables $X_{S0}$ (node 436a) that are correlated to $X_C$ (node 434a) in P but not necessarily causally related to either $X_C$ or Y (node 432a). The correlation is represented by a dotted line connecting $X_{S0}$ and $X_C$. These correlations may change in the future. Thus, a generalizable model should not include these features.

The structural causal graph 446b shows parents and children of $X_C$ (node 434b). The d-separation principle states that a node is independent of its ancestors conditioned on all its parents. Thus, Y (node 432b) is independent of $X_{S1}$ (node 438b) and $X_{S2}$ (node 440b), conditional on $X_C$. Therefore, including $X_{S1}$ and $X_{S2}$ in a machine learning model does not add predictive value. Not including $X_{S1}$ and $X_{S2}$ avoids problems that may arise when the relationships between $X_{S1}$ and $X_{S2}$ change.

The structural causal graph 446c illustrates a Markov Blanket 444. The Markov Blanket 444 may represent the exhaustive set of variables to include in a model. The Markov Blanket 444 includes Y's parents ($X_C$, node 434c), children ($Y_{ch}$, node 442c), and parents of children. Conditioned on the Markov Blanket 444, Y (node 432c) is independent of all other variables in the structural causal graph 446c, including $X_{S0}$ (node 436c), $X_{S1}$ (node 438c), and $X_{S2}$ (node 440c).

When Y has no descendants in a structural causal graph, then the effective Markov Blanket includes only the parents of Y, which in FIG. 4C are represented by $X_C$. Building a machine learning model using $X_C$ ensures that the model generalizes to other distributions of X, and also to changes in other causal relationships between X, as long as the causal relationship between $X_C$ to Y is stable. In such a case, the parents of an outcome may be referred to as causal features. It may be helpful to assume that all parents of Y are observed.

Theorem 1. Consider a data set $\mathcal{D}$ generated from a distribution P(X, Y) of size N and a structural causal graph G that connects X to Y, and a subset of causal features $X_C$ such that $X_C$ is a Markov Blanket for Y under G. Let $\mathcal{L}(h)=L_{P*}(h, f)$, where L is a symmetric loss function that obeys triangle inequality, h is a function that maps X to Y, f is the true label function for Y and P*(X, Y) is a distribution with arbitrary P*(X) but that preserves the causal relationship from $X_C$ to Y: $P(Y|X_C)=P*(Y|X_C)$.

Then a causal model $M_C$ trained on $X_C \sim \mathcal{D}$ to predict Y with symmetric loss $L_P(M_C, f)=\rho$ has lower loss $\mathcal{L}(M_C)$ over test data generated from a distribution P*(X), compared to a correlational model $M_R$ with the same training loss $L_P(M_R, f)=\rho$, $$0 \le \mathcal{L}(M_R) - \mathcal{L}(M_C) \le L_{P*}(h_{train}, h_{test})$$

where $h_{train}$ and $h_{test}$ are the loss-minimizing hypotheses for P and P* respectively over X In many cases, the full Markov Blanket may not be known, or X may contain only causes (ancestors) of Y and no descendants. In that case, the same results hold using only parents of Y.

Corollary 1. Loss $\mathcal{L}(M_C)$ of a model trained using causal features is lower than of a correlational model $\mathcal{L}(M_R)$ for any P*(X), whenever the observed variables contain only parents of Y.

As a consequence, another generalization property of causal models is that the models trained on data from two different distributions P(X) and P*(X) are likely to output the same value for a new input.

Corollary 2. Under the conditions of Theorem 1, let $h1_c$ be a causal model trained on distribution P and let $h2_c$ be a model trained on P*. Similarly, let h1 and h2 be correlational models trained on P and P* respectively. Assume that the correlational and causal models report the same accuracy α. Then for any new data input x, $$Pr(h1_c(x)=h2_c(x)) \ge Pr(h1(x)=h2(x))$$

As the size of the distribution N→∞, LHS→1.

Proof. Let $h1^{min}=\arg\min_{h \in \mathcal{H}} L_P(h, f_P)$ and similarly let $h2^{min}=\arg\min_{h \in \mathcal{H}} L_{P*}(h, f_{P*})$ be the loss minimizing hypothesis under these two distributions, where $\mathcal{H}$ is the set of hypotheses. Analogously, it is possible to define $h1_c^{min}$ and $h2_c^{min}$. For a causal model, Theorem 1 shows that $h1_c^{min}=h2_c^{min}$. As N→∞, each of models on P and P* approach their loss-minimizing functions. Then, for any input x, $$L(h1_c(x), h2_c(x))=L(h1_x^{min}(x), h2_c^{min}(x))=0$$

$$L(h1(x), h2(x))=L(h1^{min}(x), h2^{min}(x)) \ge 0$$

$$\Rightarrow Pr(h1_c(x), h2_c(x))=1 \ge Pr(h1(x)=h2(x))$$

Under finite samples, let the accuracy of each model be α. Then for any new input, the causal models predict the same output if they both match $h1_c^{min}=h2_c^{min}$ or both do not match. The probability of this event can be captured by the accuracy of the models: $\alpha^2$ if both models match $h1_c^{min}$, and $(1-\alpha)^2$ if they do not.

$$Pr(h1_c=h2_c)=\alpha^2+(1-\alpha)^2$$

For correlational models, $h1^{min} \neq h2^{min}$ for some x. For those x, assuming the same accuracy, $$Pr(h1=h2)=2\alpha(1-\alpha)$$

Because $2\alpha(1-\alpha) \leq \alpha^2 + (1-\alpha)^2 \forall \alpha \in [0,1]$, the following holds $$Pr(h1_c=h2_c) \geq Pr(h1=h2)$$

Figure 5:
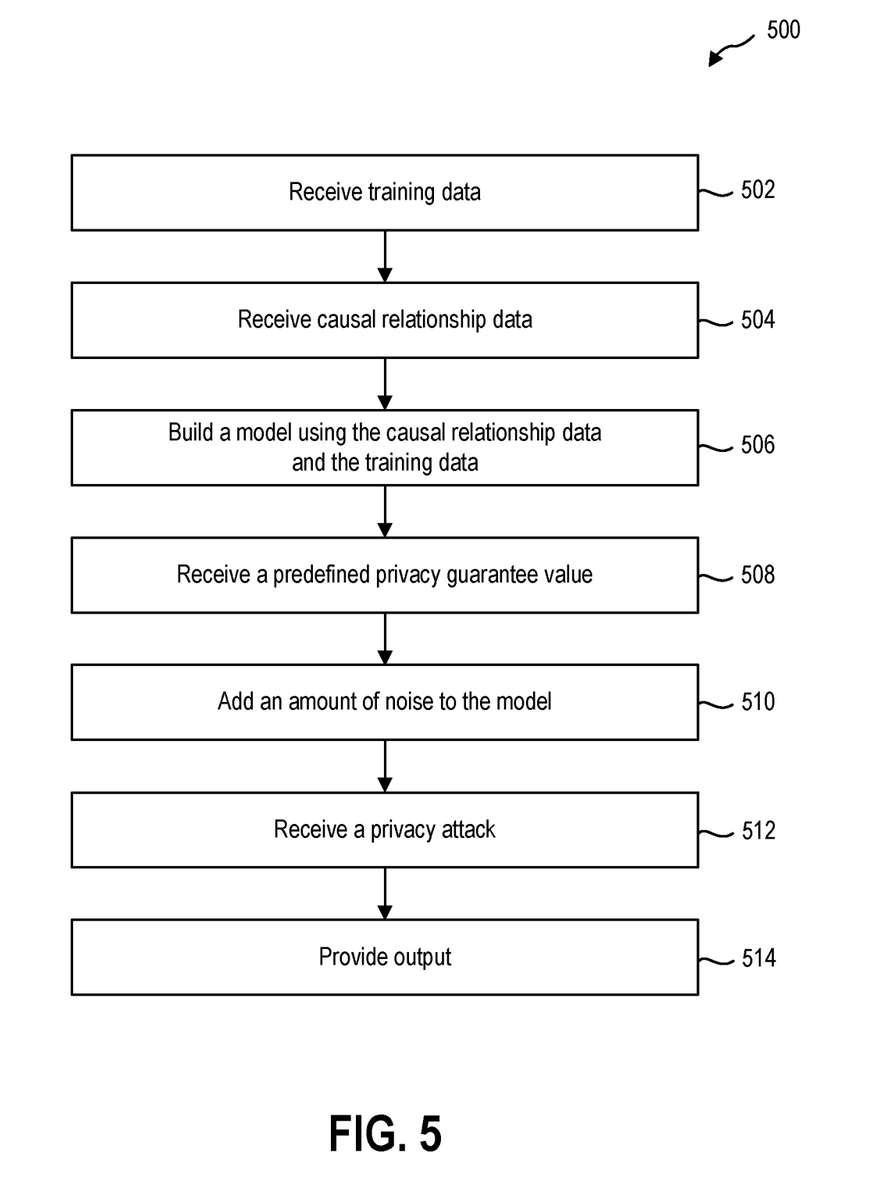
FIG. 5 illustrates an example method for improving a robustness of a machine learning model against a privacy attack.

FIG. 5 illustrates a method 500 for improving the robustness of a machine learning model against privacy attacks. For the sake of clarity, the method will be described in relation to the systems, devices, components, and data described previously.

The method 500 may include receiving 502 training data. The training data may include pairs of inputs and outputs. The training data may be the training data 102 or the training data 202.

The method 500 may include receiving 504 causal relationship data. The causal relationship data may include information regarding the causal relationships between features or a subset of features contained in the training data and an outcome or a set of outcomes. The causal relationship data may be the causal relationship data 104 or the causal relationship data 204.

The method 500 may include building 506 a model using the causal relationship data and the training data. The model may be based on the causal relationship data and the training data. The model may include a function that predicts an outcome based on an input. The model may be the causal model 108 or the causal model 208.

The method may include receiving 508 a predefined privacy guarantee value. The predefined privacy guarantee value may be a predefined differential privacy guarantee value. The predefined privacy guarantee value may be the predefined privacy guarantee 220. The predefined privacy guarantee value may be received from a data provider.

The method may include adding 510 an amount of noise to the model. The noise may be the noise 110 or the noise 210a. The amount of the noise may be based on the predefined privacy guarantee value. The amount of the noise may be an amount necessary for the model to have a privacy guarantee value equal to the predefined privacy guarantee value.

The method may include receiving 512 a privacy attack. The privacy attack may be an attempt by an adversary to infer information about the training data. The privacy attack may be a membership inference attack. The privacy attack may include sending one or more inputs to the model. The privacy attack may be the privacy attack 114 or the privacy attack 314.

The method may include providing 514 an output. The output may include predictions, confidence values, or other information responsive to the one or more inputs sent as part of the privacy attack. The privacy attack may attempt to infer information about the training data using the output. The output may be the one or more outputs 116. The output may include the first output 330a and the second output 330b.

Figure 6:
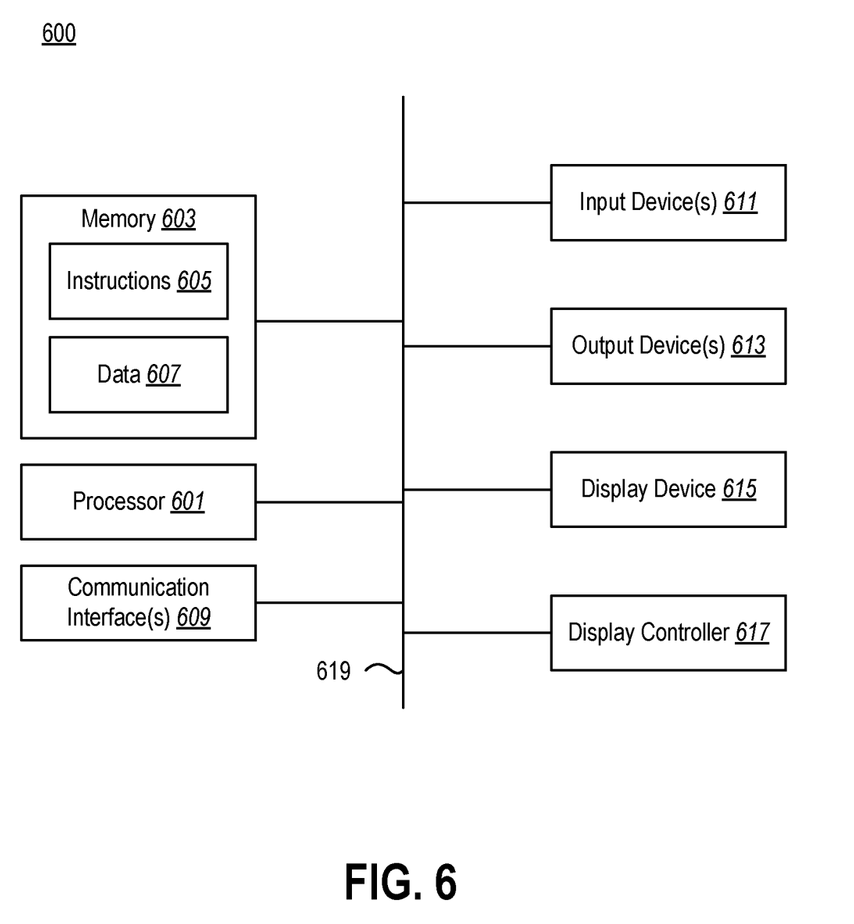
FIG. 6 illustrates certain components that may be included in a computing system.

FIG. 6 illustrates certain components that may be included within a computer system 600. One or more computer systems 600 may be used to implement the various devices, components, and systems described herein. The one or more computer systems 600 may be part of a cloud platform, and the cloud platform may provide the one or more systems and methods described herein as a cloud service.

The computer system 600 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for protecting against privacy attacks on machine learning models, comprising:
    training a machine learning model using a set of training data and causal relationship data, wherein the causal relationship data identifies, in the set of training data, a subset of features that have a causal relationship with an outcome, and wherein the machine learning model includes a function from the subset of features to the outcome;
    receiving a predefined privacy guarantee value;
    adding an amount of noise to the machine learning model such that the machine learning model has a privacy guarantee value equivalent to or stronger than the predefined privacy guarantee value, wherein an amount of noise added to the machine learning model is based on a level of protection against privacy attacks and the amount of noise is added to a level of the machine learning model based on a desired accuracy level of the machine learning model; and
    provide an output by the machine learning model based on the causal relationships between the subset of features and the outcome.

2. The method of claim 1, wherein the predefined privacy guarantee value is a differential privacy guarantee value.

3. The method of claim 1, wherein the amount of noise is added at a parameter level of the machine learning model.

4. The method of claim 1, wherein the amount of noise is added at an input level of the machine learning model.

5. The method of claim 1, further comprising: making the machine learning model available for use on test inputs from a second distribution, wherein the set of training data is from a first distribution and the first distribution is different from the second distribution.

6. The method of claim 1, further comprising:
    receiving a first test input, the first test input being part of the set of training data;
    receiving a second test input, the second test input not being part of the set of training data;
    providing a first output responsive to the first test input; and
    providing a second output responsive to the second test input, wherein the predefined privacy guarantee value indicates a likelihood of inferring from the first output and the second output that the first test input is included in the set of training data.

7. The method of claim 6, wherein the first output includes a first distribution of output scores and the second output includes a second distribution of output scores.

8. The method of claim 6, wherein the first output and the second output include one or more confidences for prediction.

9. The method of claim 1, wherein the amount of noise is less than a second amount of noise, the second amount of noise being an amount necessary for a second machine learning model trained using the set of training data but not the causal relationship data to achieve a second privacy guarantee value equal to the privacy guarantee value.

10. The method of claim 1, wherein the machine learning model has a first accuracy and the first accuracy is greater than a second accuracy of a second machine learning model trained using the set of training data but not the causal relationship data and having a second amount of noise added, the second amount of noise being such that the second machine learning model has a second privacy guarantee value equivalent to the predefined privacy guarantee value.

11. The method of claim 1, further comprising receiving a privacy attack and wherein the privacy guarantee value indicates a susceptibility to the privacy attack.

12. A method for protecting against privacy attacks on machine learning models, comprising:
    training a machine learning model using a set of training data and causal relationship data, wherein the causal relationship data identifies, in the set of training data, a subset of features that have a causal relationship with an outcome, and wherein the machine learning model includes a function from the subset of features to the outcome;
    receiving a predefined privacy guarantee value;
    receiving a predetermined accuracy level;
    adding an amount of noise to the machine learning model such that the machine learning model has an accuracy level equal to or higher than the predetermined accuracy level, wherein the machine learning model with the amount of noise has a privacy guarantee value and the privacy guarantee value is limited by the predetermined accuracy level of the machine learning model, wherein adding the amount of noise to different levels of the machine learning model impacts the accuracy level of the machine learning model differently, and the amount of noise added to a level of the machine learning model is based on a level of protection against privacy attacks and the predetermined accuracy level of the machine learning model; and provide an output by the machine learning model based on the causal relationships between the subset of features and the outcome.

13. The method of claim 12, further comprising:

receiving a first test input, the first test input being part of the set of training data;

receiving a second test input, the second test input not being part of the set of training data;

providing a first output responsive to the first test input; and providing a second output responsive to the second test input, wherein the privacy guarantee value indicates a likelihood of inferring from the first output and the second output that the first test input is part of the set of training data.

14. The method of claim 13, wherein the set of training data is from a first distribution, the second test input is from a second distribution, and the first distribution is different from the second distribution.

15. The method of claim 13, wherein the privacy guarantee value of the machine learning model is stronger than a second privacy guarantee value of a second machine learning model trained using the set of training data but not the causal relationship data and to which a second amount of noise has been added, the second amount of noise being equal to the amount of noise.

16. The method of claim 13, wherein a second machine learning model trained using the set of training data but not the causal relationship data and to which a second amount of noise added has been added has a second accuracy level equivalent to the accuracy level and wherein a second privacy guarantee value of the second machine learning model with the second amount of noise is weaker than the privacy guarantee value of the machine learning model with the amount of noise.

17. A system for protecting machine learning models from privacy attacks, comprising:

one or more processors;

memory in electronic communication with the one or more processors; and instructions stored in the memory, the instructions being executable by the one or more processors to:

receive training data, wherein the training data includes private data;

receive causal relationship data, wherein the causal relationship data is based on domain knowledge, and wherein the causal relationship data identifies, in the training data, a subset of features that have a causal relationship with an outcome;

train a model using the causal relationship data and the training data, wherein the model includes a function from the subset of features to the outcome;

add an amount of noise to the model based on a level of protection against privacy attacks and a predetermined accuracy level of the model, wherein the amount of noise is added to a level of the machine learning model based on the predetermined accuracy level of the machine learning model; and provide an output in response to a test input based on the causal relationships between the subset of features and a set of outcomes.

18. The system of claim 17, wherein the causal relationship data is a structural causal graph.

19. The system of claim 17, wherein the test input is part of a privacy attack and the test input is from a test distribution different from a training distribution of the training data.

* * * * *